Aug. 25, 1959     L. S. EDMAN     2,901,122
DISPLAY DEVICES

Filed Jan. 15, 1958     2 Sheets-Sheet 1

INVENTOR
LOUIS S. EDMAN
BY
Louis L. Gagnon
ATTORNEY

Aug. 25, 1959   L. S. EDMAN   2,901,122
DISPLAY DEVICES
Filed Jan. 15, 1958   2 Sheets-Sheet 2
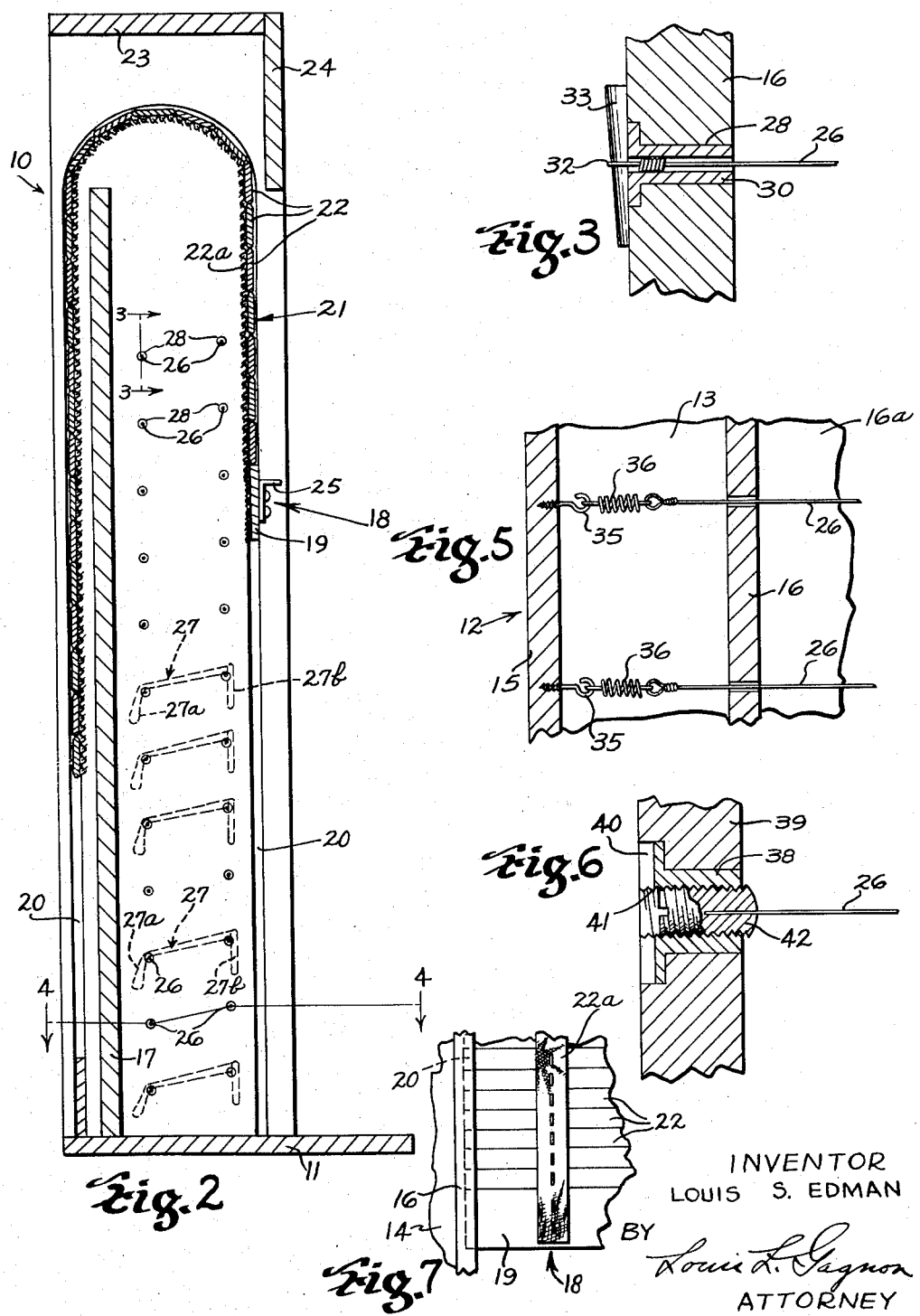
INVENTOR
LOUIS S. EDMAN
BY Louis L. Gagnon
ATTORNEY United States Patent Office 2,901,122
Patented Aug. 25, 1959

2,901,122

DISPLAY DEVICES

Louis S. Edman, Putnam, Conn., assignor to American Optical Company, Southbridge, Mass., a voluntary association of Massachusetts Application January 15, 1958, Serial No. 709,074

6 Claims. (Cl. 211—134)

This invention relates to display devices and has particular reference to improved means for displaying articles such as spectacle frames or the like.

The principal object of the present invention is to provide novel means for supporting and displaying articles of merchandise, such as spectacle frames or the like, wherein an impression of their floating in mid-air is created whereby their aesthetical characteristics may be more readily viewed.

Another object is to provide novel inconspicuous suspension means for supporting a plurality of articles to be displayed in a device of the above character which means is such as to permit said articles to be simply and quickly arranged on said suspension means so as to readily produce an artistically balanced effect or grouping thereof regardless of their shape, size or number.

Another object is to provide means in a device of the above character which overcomes the need for conventional dust-catching and unattractive trays, channels, clips, hooks or other such means which have been used heretofore to support articles on display.

A further object is to provide in a display device designed to exhibit eyewear such as spectacle frames or the like, inconspicuous suspension means for supporting said eyewear while permitting said eyewear to be exhibited with the temple parts thereof opened or in their normal positions of use.

A still further object is to provide a device of the above character which is attractive, extremely simple and inexpensive to manufacture, highly efficient in use and which provides novel means for artistically displaying merchandise without the distraction of conventional fasteners or the like.

Other objects and advantages of the invention will become apparent from the following description when taken in conjunction with the accompanying drawings in which:

Fig. 2 is an enlarged vertical cross-sectional view taken substantially along line 2—2 of Fig. 1 looking in the direction of the arrows;

Fig. 3 is an enlarged fragmentary cross-sectional view of a part of the suspension means of the invention taken on line 3—3 of Fig. 2 looking in the direction of the arrows;

Fig. 5 is an enlarged cross-sectional view of a modified form of suspension means which may be incorporated in the device of the invention;

Fig. 6 is an enlarged cross-sectional view of a further modified form of suspension means which also may be used in conjunction with the device of the invention; and Fig. 7 is a fragmentary rear view of a closure means forming a part of the device of the invention.

Figure 1:
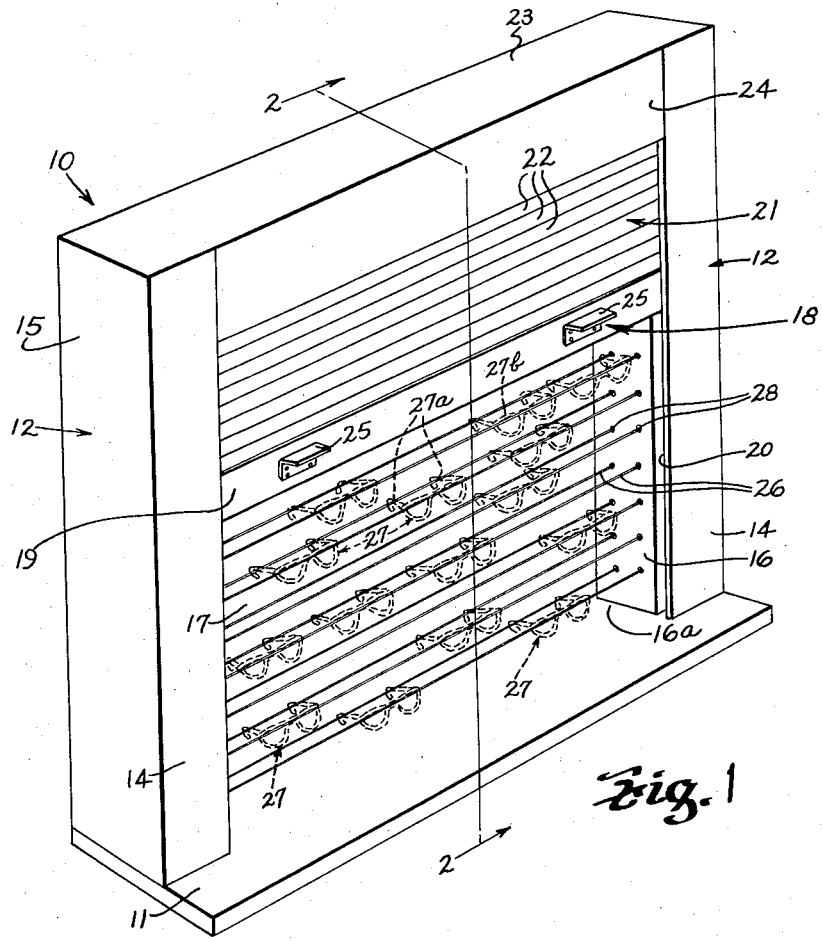
Fig. 1 is a front perspective view of the device of the invention.

Referring more particularly to the drawings wherein like characters of reference designate like parts throughout the several views thereof, the device of the invention embodies a rectangular box-like structure 10 fabricated of wood or any other relatively rigid material such as plastic, sheet metal or heavy pressed board. The structure 10 comprises a base 11 having side parts 12 each of which form a vertically extending enclosure 13 opening to the back of the structure 10. The enclosures 13 are concealed by front and side panels 14 and 15 respectively and panels 16 which extend rearwardly in substantially parallel relation to their respective panels 15. A backing 17 extending between the panels 16 is provided to form a display area 16a opening forwardly of the structure 10 and in which articles to be exhibited are placed. In the device illustrated, there is provided a closure member 18 which is adapted to be adjusted to completely cover the front of the display area 16a or to expose any desired portion of said area.

The closure member 18 is of the roll-away type and comprises a rigid end part 19 which extends between the panels 16 with its opposite ends tongued into a respective guide slot or track 20 which is provided in each of the panels 16. The tracks 20 are identical and are in the form of an inverted U beginning at the base 11 adjacent the front end of the display area 16a and doubled back about a radius of curvature adjacent the top of the structure 10 which radius is such as to cause the opposite leg of the U to lie behind the backing 17 (see Fig. 2). A curtain part 21 is attached to the part 19 and comprises a plurality of slats 22 having their opposed ends fitted into a respective one of the tracks 20 and their longitudinal edges connected in pivotally engaging relation with each other by means of elongated strips of fabric or the like 22a which are fastened to the rear surfaces of each of the slats 22 and to the rear surface of the part 19. The curtain portion 21 of the closure member 18 is of a length sufficient to cover the front of the display area within the structure 10 when the part 19 is drawn down to engage the base 11. The upper end of the structure 10 is provided with top and front panels 23 and 24 respectively, which are adapted to conceal the curved upper portion of the inverted U shaped tracks 20.

It can be seen that by sliding the part 19 upwardly in tracks 20 by the use of handles or the like 25, the curtain portion 21 thereof will be forced to follow tracks 20 and disappear behind the backing 17 when the structure 10 is viewed from the front.

In order to provide means for supporting articles to be exhibited within the display area 16a of the structure 10, there is provided a plurality of transversely extending relatively small-gage inconspicuous wires or threads 26 which are so located in pairs as to effectively form a plurality of superimposed shelves upon which articles such as spectacle frames 27 or the like may be placed. The wires or threads 26 are passed through openings 28 provided in the panels 16 and are placed under tension between panels 16 by adjustable holding means such as illustrated in Figs. 3, 5 and 6 so as to support the weight of articles to be displayed thereon without sagging.

Figure 4:
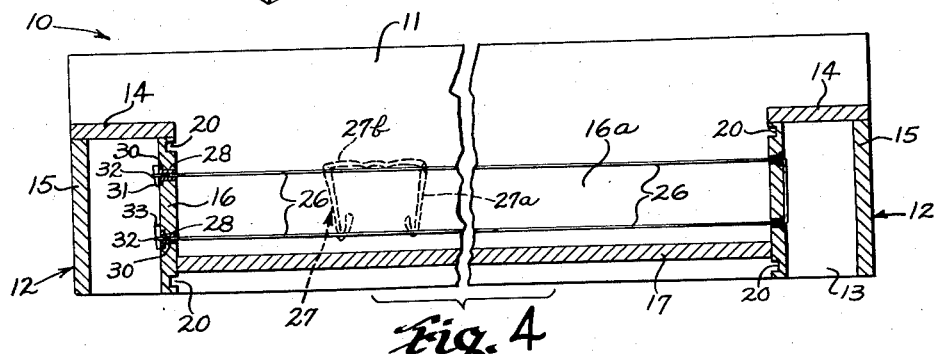
Fig. 4 is a fragmentary cross-sectional view taken substantially along line 4—4 of Fig. 2 looking in the direction of the arrows.

Referring more particularly to Figs. 1–4 of the drawings wherein there is shown one preferred means for assembling the wires or threads 26 with the panels 16, a single wire or thread is used to form each one of the shelves which support the spectacle frames 27 and each of the openings 28 in the panels 16 are provided with a bushing 30 through which the wires or threads 26 extend.

In forming one of the above mentioned shelves, one end of a wire or thread 26 is passed through a bushing 30 in one of the openings 28 and is anchored within the adjacent enclosure 13 by a wedge or tapered pin 31 or the like which is passed through a loop 32 formed on the end of the wire or thread 26. The free end of the wire or thread 26 is threaded through a second bushing 30 in a second opening 28 in the opposite panel 16, which second opening is aligned with the first mentioned opening. The wire or thread is then directed toward the rear of the structure 10 and is threaded outwardly into the display area 16a thereof through a third bushing 30 and opening 28 whereupon it is next passed through a fourth bushing 30 in another opening 28 in the first mentioned panel 16 and is provided with a loop 32 on its free end (see Figs. 3 and 4). In order to anchor the free end of the wire or thread 26 a wedge or tapered pin 33 is passed through the loop 32, in the manner illustrated more particularly in Fig. 3, and the tension on the wire or thread 26 is adjusted in accordance with the extent to which one or both of the tapered pins 31 and 33 are forced into their respective loops 32 on the wire or thread 26.

It is pointed out that a particular shelf may be formed within the display area by using two separate wires or threads 26 or, alternatively, more than one shelf may be formed with a single wire or thread by passing the wire or thread back and forth across the display area 16a between the panels 16 and through several of the openings 28 therein. In all cases, both ends of a particular wire or thread must be anchored within one or the other of the enclosures 13 and at least one end of said wire or thread must be provided with a tensioning means such as the tapered pin or wedge 33 illustrated in Fig. 3.

It is also to be understood that the arrangement of shelves such as the spacing therebetween or their particular location within the display area of the structure is determined by the relative locations of the holes 28 in the panels 16.

When using the device of the invention to display spectacle frames, it has been found most advantageous to place the forward wire or thread of a particular shelf slightly higher than its respective rearwardly disposed wire or thread as illustrated more particularly in Fig. 2. In so doing, the temples 27a of the spectacle frames 25 which, when in open position, are inclined downwardly relative to the front parts 27b thereof, will, when rested on the two wires or threads 26 of a particular shelf, cause the front parts 27b to be disposed in a substantially vertical plane. This not only exhibits the frames 27 in a position simulating the position at which they would be worn on the face but further tends to prevent the frames from sliding forward on a shelf particularly when other frames are removed from or placed upon the same shelf.

Other means for securing and tensioning the wires or threads in a device of the above character are shown in Figs. 5 and 6 wherein Fig. 5 illustrates a resilient connecting means for attaching the ends of the wires or threads 26 to the side parts 12 of the structure 10. The arrangement shown in Fig. 5 embodies hook members 35 attached to the inner wall of a side panel 15 and extending into the adjacent enclosure 13. A spring 36 is connected between each of the looped ends of the wires or threads 26 and their respective hooks 35 to hold the wires or threads 26 in a desired position of use while simultaneously providing a tensioning thereof. The springs 36 are selected to be of a predetermined tension or resiliency so that when expanded to connect the wires or threads 26 with their respective hooks 35, they will constantly exert a predetermined pull on said wires or threads. It is pointed out that other suitable resilient means may be used to replace the springs 36.

In Fig. 6 there is shown a further modified form of connecting means for holding the wires or threads 26 in a desired position of use and under tension in a structure such as described hereinabove. The arrangement shown in Fig. 6 embodies a shouldered bushing 38 rotatably mounted in an opening provided in a side panel portion 39. The bushing 38 is provided with an enlarged slotted head part 40 and a threaded bore 41 extending longitudinally therethrough in which a screw-like member 42 is threadedly positioned. One end of a wire or thread 26, which is to be placed under tension is soldered to, extended through an opening in and knotted at its end or otherwise secured to the member 42 and with the opposite end of the wire or thread 26 anchored to the display device. The tightening of the wire or thread 26 is accomplished by rotating the bushing 38 in a direction such as to cause the member 42 to threadedly advance toward the head 40 of the bushing 38. The bushing 38 may be rotated with a conventional screw driver placed in the slot provided in the head part 40 thereof.

With an arrangement such as shown in Fig. 6, the side parts 12 of the structure 10 (Figs. 1, 2 and 4) which include panels 14, 15 and 16, could each be replaced by a single panel 39 to reduce the overall width of the structure 10. However, if it is desired to conceal the head parts 40 of the bushings 38, the combined bushings 38 and members 42 could alternatively be used to replace the bushings 30 in panels 16 of Figs. 1, 2 and 4.

It is particularly pointed out that the structure 10 of the invention may be modified in its styling by eliminating the concealed enclosures 13 in the manner discussed above and/or by eliminating the closure member 18 which functions only to cover the front of the display area 16a. Furthermore, a plurality of identically styled structures 10 may be placed in side by side relation with each other to form an integrated display unit.

The wires or threads 26 are preferably formed of stainless steel, nylon or other suitable durable material and are of a fine gage so as to be practically invisible to cause the spectacles or other articles supported thereby to appear as floating in mid-air and to be readily visible.

From the foregoing, it can be seen that improved, simplified and economical means has been provided for accomplishing all of the objects and advantages of the invention. However, it should be apparent that many changes in the details of construction and arrangement of parts may be made by those skilled in the art without departing from the spirit of the invention as expressed in the accompanying claims and the invention is not to be limited to the exact matters shown and described herein as only the preferred matters have been given by way of illustration.

Having described my invention, I claim:

1. In a display device of the character described the combination of a base having vertically disposed side supports attached to said base in fixed spaced relation with each other, each of said supports having a pair of rows of vertically spaced openings therein with the respective openings in one of said supports being transversely aligned with the openings in the other of said supports and with the rearmost row of openings in each of said supports being located a given amount below the respective openings of the forwardly disposed row of openings in said supports, a plurality of substantially parallel normally limp thread-like members spanning the space between said supports, each of said members extending into a respective pair of transversely aligned openings and means for securing said thread-like members under tension to said supports.

2. In a display device of the character described the combination of a base having vertically disposed side supports attached to said base in fixed spaced relation with each other, each of said supports having a pair of rows of vertically spaced openings therein with the respective openings in one of said supports being transversely aligned with the openings in the other of said supports, the openings of one of said rows in each of said supports being located in vertically offset relation with the respective openings of the other of substantially parallel normally limp said rows, a plurality of thread-like members spanning the space between said supports, each of said members extending into a respective pair of transversely aligned openings and means for securing said thread-like members under tension to said supports.

3. In a device of the character described the combination of a base, side panels on said base each having a plurality of openings therethrough, means for supporting said side panels in fixed predetermined spaced relation with each other on said base, a plurality of normally limp thread members each having loops formed on the opposed ends thereof and disposed to extend between said side panels and through said openings for supporting articles to be exhibited thereon, and adjustable tapered members resting against a side of said side panels and extending through the looped ends of each of said thread members for wedging and tightening the span of said members between said side panels.

4. In a device of the character described the combination of a base, spaced apertured inner side walls on said base, side panels on said base spaced outwardly of the inner side walls, a plurality of normally limp wire members extending between said inner side walls and through the apertures therein for supporting articles to be exhibited, and tensioning means lying within said inner side walls and panels for attaching the ends of said wires to said side panels under tension.

5. In a device of the character described the combination of a base, side panels on said base each having a plurality of openings therethrough and a rotatable bushing member in each of said openings, said bushings each having a threaded bore therethrough and a screw part threaded in said bore, means for supporting said side panels in fixed predetermined spaced relation with each other on said base, a plurality of wire members extending between said side panels for supporting articles to be exhibited thereon, the ends of said wire members each being attached to one of said screw parts whereby said screw parts when threaded in a direction outwardly of their respective bushing members by rotation of said members will cause a tightening of the wire members attached thereto.

6. A display device of the character described comprising a base, side panels on said base in fixed spaced relation with each other, each of said side panels having a pair of rows of vertically spaced openings therein with the respective openings in one of said side panels being transversely aligned with the openings in the other of said side panels, the openings in one of said rows in each of said side panels being located in vertically offset relation with the openings in the other of said rows, a rotatable bushing in each of said openings, said bushings each having a threaded bore therethrough and a screw part threaded in said bore, a plurality of transversely extending threadlike members spanning the space between said side panels for supporting articles to be exhibited thereon, the ends of said threadlike members each being attached to a respective one of said screw parts whereby said screw parts when threaded in an outward direction by rotation of said bushing members will cause a tensioning of said threadlike members attached thereto.

References Cited in the file of this patent
UNITED STATES PATENTS

| | | |
|---|---|---|
| 1,489,923 | Budd | April 8, 1924 |
| 2,152,192 | Hoffman | Mar. 28, 1939 |
| 2,236,870 | Derman | Apr. 1, 1941 |
| 2,346,222 | Knourek | Apr. 11, 1944 |
| 2,563,237 | Grocoff | Aug. 7, 1951 |